US008037005B2

(12) United States Patent
Willaeys et al.

(10) Patent No.: US 8,037,005 B2
(45) Date of Patent: Oct. 11, 2011

(54) DEVICE AND METHOD FOR A SYSTEM ANALYSIS AND DIAGNOSIS

(75) Inventors: Didieb Willaeys, Noyelles sur Escaut (FR); Abdallah Asse, Wattignies (FR)

(73) Assignee: Prosyst, Rueil Malmaison (FR)

( * ) Notice: Subject to any disclaimer, the term of this patent is extended or adjusted under 35 U.S.C. 154(b) by 1027 days.

(21) Appl. No.: 11/576,071

(22) PCT Filed: Sep. 28, 2005

(86) PCT No.: PCT/FR2005/002400
§ 371 (c)(1),
(2), (4) Date: Jul. 20, 2007

(87) PCT Pub. No.: WO2006/035163
PCT Pub. Date: Apr. 6, 2006

(65) Prior Publication Data
US 2008/0086288 A1    Apr. 10, 2008

(30) Foreign Application Priority Data

Sep. 28, 2004 (FR) .................................. 04 10271

(51) Int. Cl.
*G06N 5/02* (2006.01)
(52) U.S. Cl. ................. 706/48; 700/19; 700/28
(58) Field of Classification Search ............. 706/48; 700/19, 28
See application file for complete search history.

(56) References Cited

U.S. PATENT DOCUMENTS

| 4,616,308 | A | 10/1986 | Morshedi et al. |
| 5,079,731 | A | 1/1992 | Miller et al. |
| 5,752,008 | A | 5/1998 | Bowling |
| 5,818,736 | A | 10/1998 | Leibold |
| 6,336,085 | B1 | 1/2002 | Ueda et al. |
| 6,853,920 | B2 * | 2/2005 | Hsiung et al. ............ 702/1 |
| 6,985,779 | B2 * | 1/2006 | Hsiung et al. ............ 700/19 |

FOREIGN PATENT DOCUMENTS
FR    2 686 714    7/1993
* cited by examiner

*Primary Examiner* — Jeffrey A Gaffin
*Assistant Examiner* — Mai T Tran
(74) *Attorney, Agent, or Firm* — Ladas & Parry LLP (57) ABSTRACT

A device and a method for the analysis and troubleshooting of a system, based on the use of a model of the system, with application in particular in the area of industrial installations controlled by automatic control systems of the programmed or wired logic type. The method includes a stage for initialisation of the model, and a stage for the creation of a list of discordant variables whose value in the system differs from that predicted by the model. For each of the variables belonging to a discordance list, an initial list of suspect variables, suspected of having generated the discordant value, is created, and then a restricted list of suspect variables is obtained by filtration of the initial list.

16 Claims, 7 Drawing Sheets

DEVICE AND METHOD FOR A SYSTEM ANALYSIS AND DIAGNOSIS

BACKGROUND OF THE INVENTION

This present invention has as its subject a device and a method for the analysis and troubleshooting of a system, in particular, but not only, in the area of industrial installations. The invention is, in particular but not only, suitable for application in industrial installations controlled programmed or wired logic automatic control systems.

DISCUSSION OF THE STATE OF THE ART

Automatic control and command systems are to be found in most industrial installations, and in particular automatic control systems of the programmed or wired logic type. In general, the control systems of these industrial installations include an input module for monitoring the state of the variables associated with the sensors of the controlled industrial installation system, and an output module for controlling the actuators of this system. These input-output modules are connected to a peripheral bus which in turn is connected to a central unit delivering commands to control the said system.

These systems therefore generally include a program which we will call an operating program, and an operating or actuating mechanism.

Analysis of the operation of these systems is a very important point, in particular during commissioning into service, in order to reduce the costs of integration, or indeed in the event of failure, in order to achieve a rapid and efficient diagnosis. In this context, one must not be limited to simple empirical analyses and/or reliance on experience in order to detect any deviation or divergence that might seriously disrupt production.

This is why the systems of previous design generally include a troubleshooting application alongside their actuating mechanisms and their operating programs. By convention, this application takes the form of a program which is designed for each machine, integrated into the operating program, and which generally represents some 70% of the whole program. Such an application is therefore generally expensive, complex, and not reusable since it is designed for a single machine.

Solutions do exist which are based on the use of standard fault-finding modules, which can be reused from one program to the next, but which are generally designed for a given range of systems. Furthermore, these solutions include the putting into equation form of any abnormal operating conditions or non-standard conditions, making them unusable in many cases. In fact these solutions are excessively expensive, and a list of the non-standard conditions that can be included is never exhaustive (it is easier to determine the normal operating conditions).

Furthermore, the location of a fault in certain systems is a long and complex operation which requires physical action in order to reach the suspect areas. It is therefore essential to locate the part of the system necessitating attention rapidly and accurately. There is therefore a requirement for a reliable solution which can overcome the aforementioned drawbacks. It is the purpose of the invention to overcome these drawbacks by proposing a method and a device for the analysis of a system which can be used in particular to reach a rapid diagnosis on the operation of the system, without impeding the operating programs of the said system, and which can be reused from one system to another.

SUMMARY OF THE INVENTION

To this end, the invention is based on the use of a model of the real system, a veritable virtual system, constructed by the identification of groups or units which are defined by characteristic variables or magnitudes, and which include the variables that directly or indirectly influence these characteristic variables. The construction of such a model is not the purpose of this present invention. By way of an example, one can mention patent FR 2 686 714, which describes a method of simulating an industrial process, based on the concept of kinetic axis and a sector or range of values.

According to a first aspect, the invention therefore relates to a method for the analysis of a system based on the use of a model. The model includes at least two variables which are divided into one or more groups. Each of the groups is defined by one or more variables called characteristic variables and groups together, in addition to these characteristic variables, all the other variables having a direct or indirect influence on the value of at least one of the characteristic variables of the group. These variables are called influent variables. The state of the virtual system at any given instant, predicted by the model, is thus defined by the respective values of influent or characteristic variables. The method of the invention, based on such a model, is thus characterised in that it includes a first stage of initialisation of the model in a state corresponding to a given state of the system, and a second stage of creation of a list called the discordant variables list, which includes the characteristic variables whose value in the system differs from that predicted by the model. By prediction is meant both the prediction of a change of state and the prediction of an absence of change. The method of the invention also includes, for each characteristic variable in a discordant variables list, a third stage of processing that includes the creation of an initial list of suspect variables grouping together the influent variables that may have generated the discordant value of the discordant variable concerned and a stage of creation of a restricted list of suspect variables by filtration of the initial list of suspect variables.

In an implementation variant, the stage for creation of a discordant variables list includes a stage of prediction by the model of the state of the system from a given command, and a stage of comparison of the predicted state with the real state of the system. When the comparison indicates a difference between the two states, meaning between the value of one or more characteristic variables in the model and the value of these characteristic variables in the real system, the latter are inserted into a discordant variables list. Otherwise, meaning when the comparison indicates no difference between the two states, the variables of the model are updated to validate its state and continue the process.

In an implementation variant, a simplified model is constructed from the initial by taking account in each group only with the influent primary variables and of the characteristic variables, with a primary influent variable being an influent variable on which no other variable of the same group has influence. This model is used in place of the initial model in the stage for creation of a discordant variables list.

Where appropriate, this discordant variables list is sorted, using a dependency graph with which is associated a partial order relation sequencing the groups. The discordant variables belonging to the group of highest rank is placed in first position, and so on.

In an implementation variant, the stage for creation of the initial list of suspect variables consists of selecting all the influent variables forming part of the group to which the discordant variable being processed belong.

In another implementation variant, this stage for the creation of an initial list of suspect variables includes a pre-diagnosis stage to preselect a subset of suspect variables from among the influent variables forming part of the group to which the discordant variable being processed belong.

In an implementation variant, the stage for creation of the restricted list of suspect variables consists of eliminating the suspect variables of the initial list which either generate no discordant value in the model for each of the variables of a discordant variables list, or generate a discordant value in the model for at least one characteristic variable not belonging to a discordant variables list.

Preferably, the stage for creation of the restricted list of suspect variables includes two successive filtration stages. The first filtration eliminates the suspect variables that do not generate the discordant value for the discordant variable being processed. The second filtration eliminates the suspect variables which either generate a discordant value for at least one characteristic variable other than the discordant variable being processed, where this other characteristic variable does not belong to a discordant variables list, or generates no discordant value for at least one characteristic variable other than the discordant variable being processed, where this other characteristic variable belongs to a discordance lists.

In an implementation variant, the method is used for the analysis of an industrial system controlled by automatic control systems.

According to a second aspect, the invention relates to a device for the analysis of a system, based on the use of a model. This model includes at least two variables which are divided into one or more groups. Each of the groups is defined by one or more variables called characteristic variables and groups together, in addition to these characteristic variables, all the other variables having a direct or indirect influence on the value of at least one of the characteristic variables of the group. The latter variables are called influent variables. The state of the virtual system at any given instant, predicted by the model, is thus defined by the respective values of influent or characteristic variables. The device of the invention, based on such a model, is thus characterised in that it includes resources for storing the data defining the model, processing resources to implement the model, resources for comparing the state of the system predicted by the model and the state of the real system, resources for storing a list of characteristic discordant variables resulting from the comparison effected by the comparison resources, resources for selection in the model of the suspect variables that may have generated the discordant value of at least one characteristic discordant variable, resources for filtration of the said initial influent suspect variables in order to obtain the restricted influent suspect variables, and resources for storing the said initial influent suspect variables and the said restricted influent suspect variables.

BRIEF DESCRIPTION OF THE DRAWING FIGURES

Other characteristics and advantages of the invention will appear more clearly and more fully on reading the description that follows of the preferred methods of implementation of the method and for the creation of the device, which are given by way of non-limiting examples and with reference to the following appended drawings.

DETAILED DESCRIPTION OF THE PREFERRED EMBODIMENTS

Figure 1:
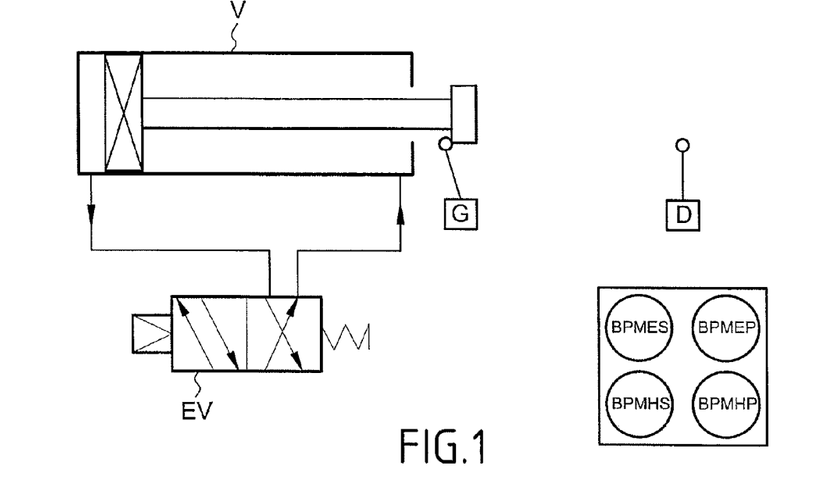
FIG. 1 schematically represents an example of a simplified industrial installation whose principal element is an actuator, FIG. 2 schematically represents the electrical relations between the elements of the system of FIG. 1, FIG. 3a schematically represents the complete model of the system of FIG. 1, FIG. 3b schematically represents the direct or simplified model of the system of FIG. 1.

FIG. 1 schematically represents an example of a simplified industrial installation whose principal element is an actuator V of the single shaft and single effect type with evacuation to the atmosphere. This actuator is controlled by a power distributor of solenoid valve type EV. When the actuator is in the retracted position, or the left position, sensor G is operated and sensor D is not. When the actuator is in the extended or right position, sensor D is operated and sensor G is not. The system also has four push buttons, namely a switch-on button BPMES, a switch-off button BPMHS, a power-on button BPMEP, and a power-off button BPMHP.

Figure 2:
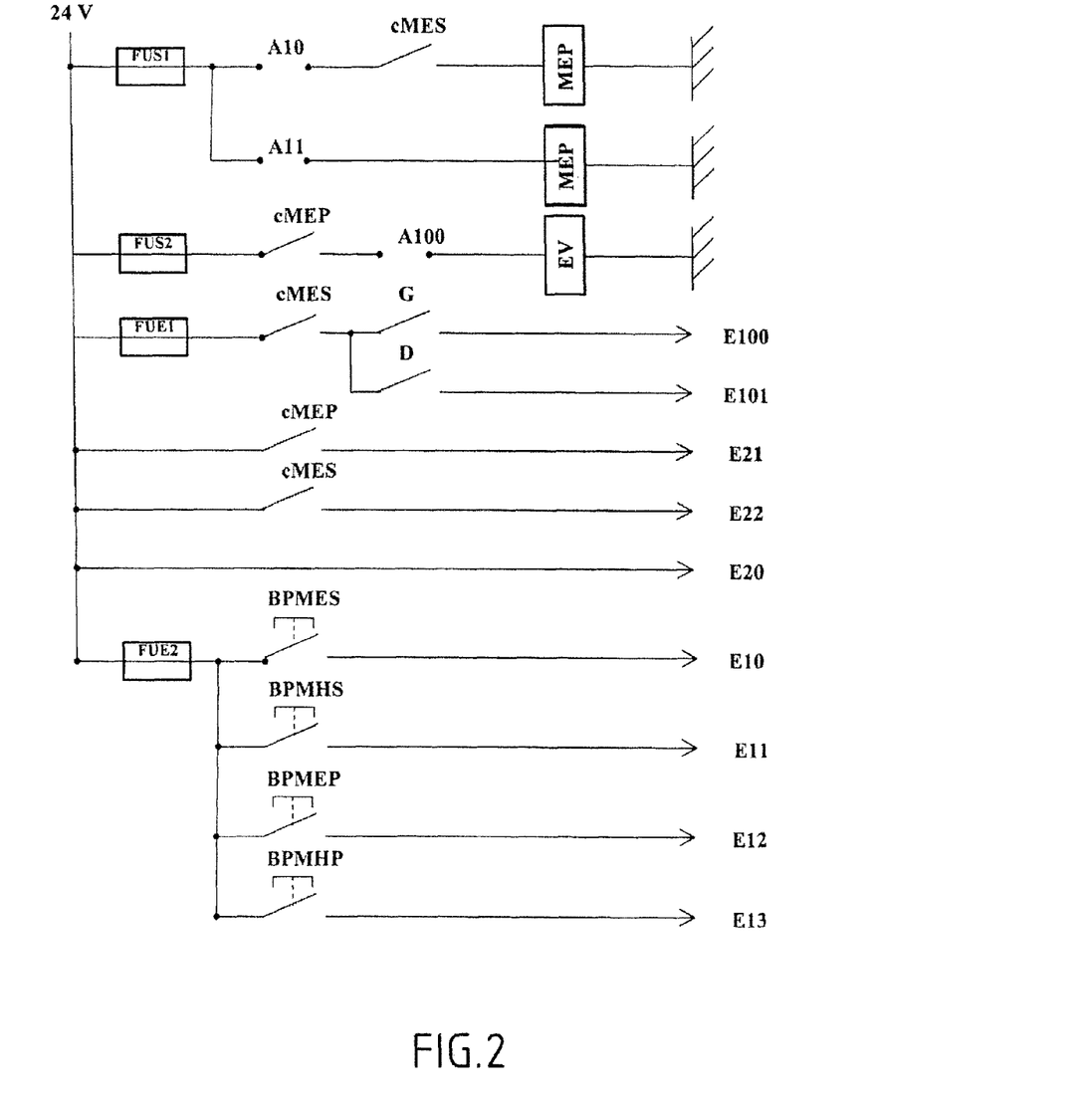

FIG. 2 schematically represents the electrical relations between the elements of the system of FIG. 1. Thus, via a fuse FUS1, the 24 volt supply feeds two controls A10, A11 that are operated from the control system. A10 and A11 are therefore outputs of the control system and inputs of the model. A10 controls the coil of the power-on relay MEP by means of a contact of the switch-on relay MES. A11 controls the coil of the switch-on relay MES.

The power-on relay MEP feeds control A100 through a fuse FUS2. A100 controls the coil of the solenoid valve EV.

Through a fuse FUE1, the switch-on relay MES feeds sensor G in the open or closed position, which is connected to input E100, and sensor D in the open or closed position, which is connected to input E101.

The 24 volt supply also directly feeds a contact of power-on relay MEP, in the open or closed position, connected to input E21, and a contact of switch-on relay MES in the open or closed position E22. The 24V supply is also connected directly to input E20.

Finally, through fuse FUE2, the 24V supply feeds the connectors of the switch-on button BPMES, the switch-off button BPMHS, the power-on button BPMEP, and the power-off button BPMHP, which are respectively connected to inputs E10, E11, E12 and E13.

Figure 3A:
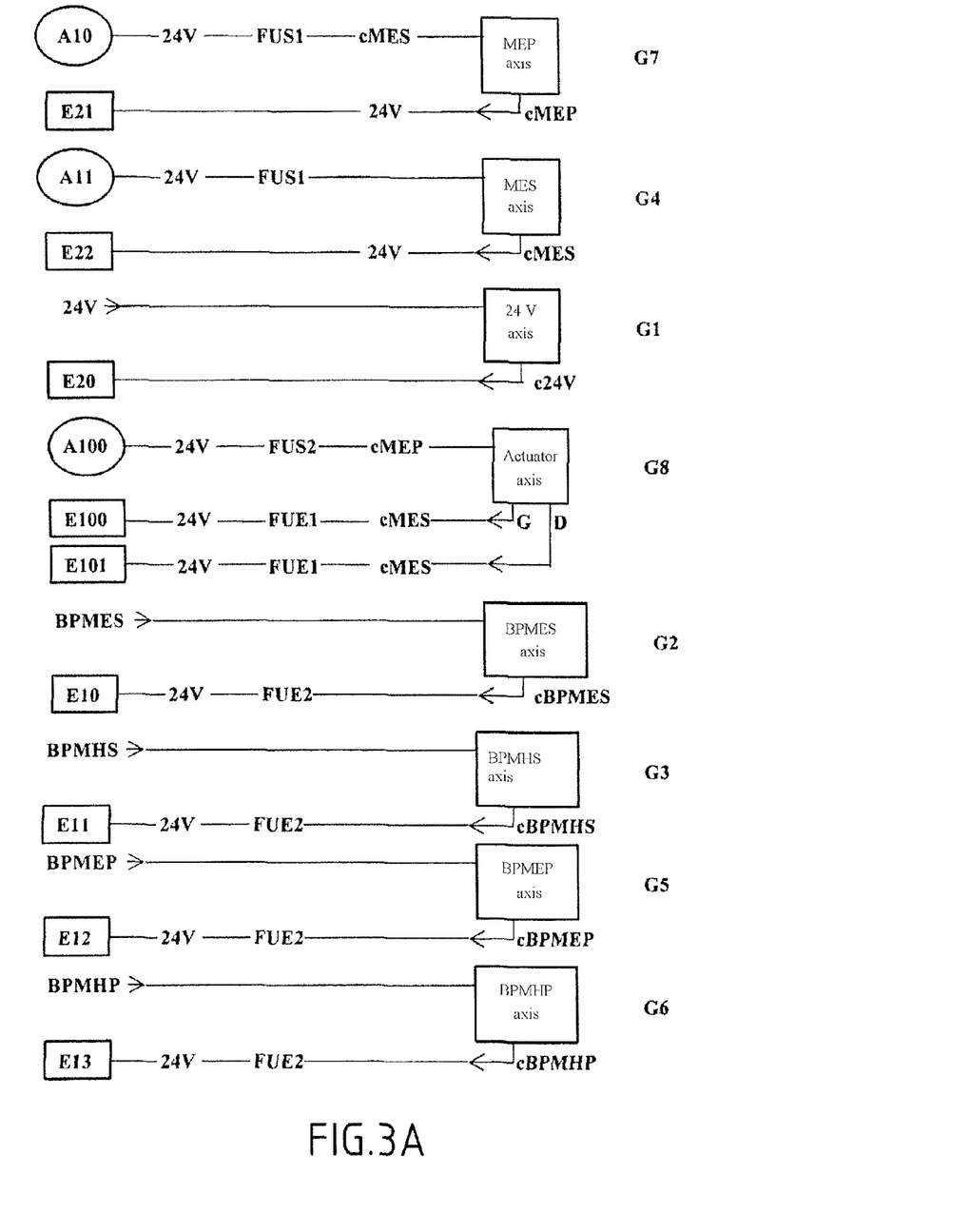

FIG. 3a schematically represents all of the elements of the system of FIG. 1 and their relations in the complete model of the system. This graph highlights eight groups (or kinetic axes). Group G1 corresponds to the group with the 24 volt supply, group G2 corresponds to the switch-on button BPMES. Group G3 corresponds to the switch-off button BPMHS. Group G4 corresponds to the switch-on relay MES. Group G5 corresponds to the power-on button BPMEP. Group G6 corresponds to the power-off button BPMHP. Group G7 corresponds to the power-on relay MEP. Finally, group G8 corresponds to the actuator itself, with the solenoid valve EV.

This modelling is used to identify and to view all the variables of the system. Among these variables are found characteristic variables E10, E11, E12, E13, E20, E21, E22, E100, E101 (input variables of the control system), associated respectively with the switch-on button BPMES, the switch-off button BPMHS, the power-on button BPMEP, the power-off button BPMHP, the 24V supply, the power-on relay MEP, the switch-on relay MES, the left sensor G, and the right sensor D.

All the other variables are therefore influent variables. Certain of these variables are said to be influent primary variables in a given group, when no other variable is influencing them. This is the case, for example, of A100, FUS2 and FUE1. Others are said to be actuating variables (one per group) such as MEP and MES for example.

We therefore find the following lines of influence:
in group G1: 24V, E20,
in group G2: BPMES, FUE2, 24V, E10,
in group G3: BPMHS, FUE2, 24V, E11,
in group G4: A11, 24V, FUS1, MES, E22,
in group G5: BPMEP, FUE2, 24V, E12,
in group G6: BPMHP, FUE2, 24V, E13,
in group G7: A10, 24V, FUS1, MES, MEP, E21,
in group G8:
   A100, 24V, FUS2, MEP, actuator, G, MES, FUE1, E100,
   A100, 24V, FUS2, MEP, actuator, D, MES, FUE1, E101

Figure 3B:
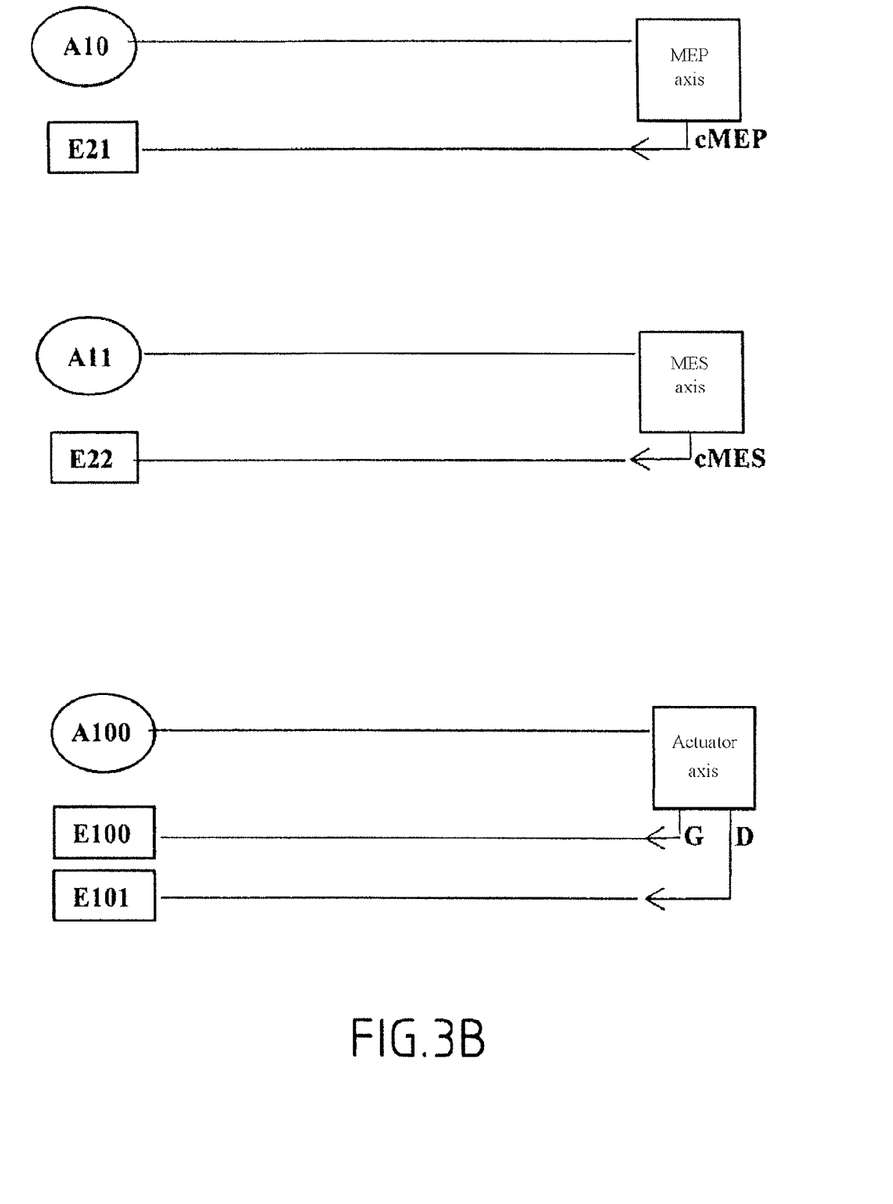

We will describe, as a simplified model, the model in which no account is taken of the intermediate influent variables that are not actuating variables. It therefore concerns only the groups controlled by the automatic control system (and therefore with automatic control system outputs). This simplified model, schematically represented in FIG. 3b, is therefore, in our example, composed of the following simplified lines of influence:
in G1: none,
in G2: none,
in G3: none,
in G4: A11, MES, E22
in G5: none,
in G6: none,
in G7: A10, MEP, E21
in G8:
   A100, actuator, G, E100,
   A100, actuator, D, E101.

Figure 4:
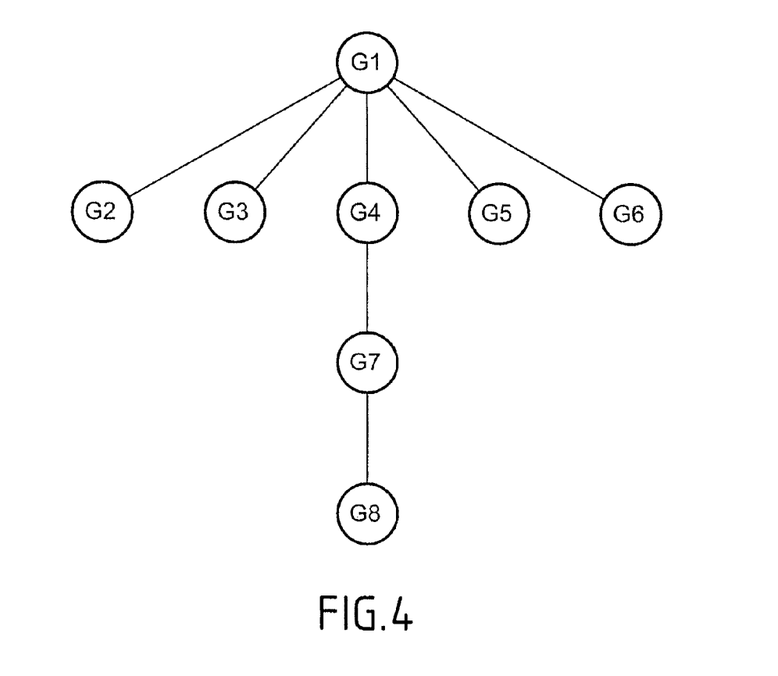
FIG. 4 represents the dependency graph of the groups of the system of FIG. 1, FIGS. 5a, 5b, 5c, 5d schematically represent the chaining of the different stages of the analysis method of the invention.

FIG. 4 represents a dependency graph organising groups G1 to G8 of the system of FIG. 1, with which is associated a partial order relation. The graph can be read in the following manner: G1 is upstream of G2, G3, G4, G5, and G6; G4 is upstream of G7 which is upstream of G8. It is possible to replace the expression "is upstream of" by the expression "influences". It can be seen clearly in this example that the relation is a partial order relation since G2, G3, G4, G5 and G6 are at the same level.

All of the elements of the modelling in the example of FIG. 1 having been described in relation to FIGS. 2, 3a, 3b and 4, we are now going to describe the analysis method of the invention, with reference to FIGS. 5a to 5d.

Figures 5A, 5B:
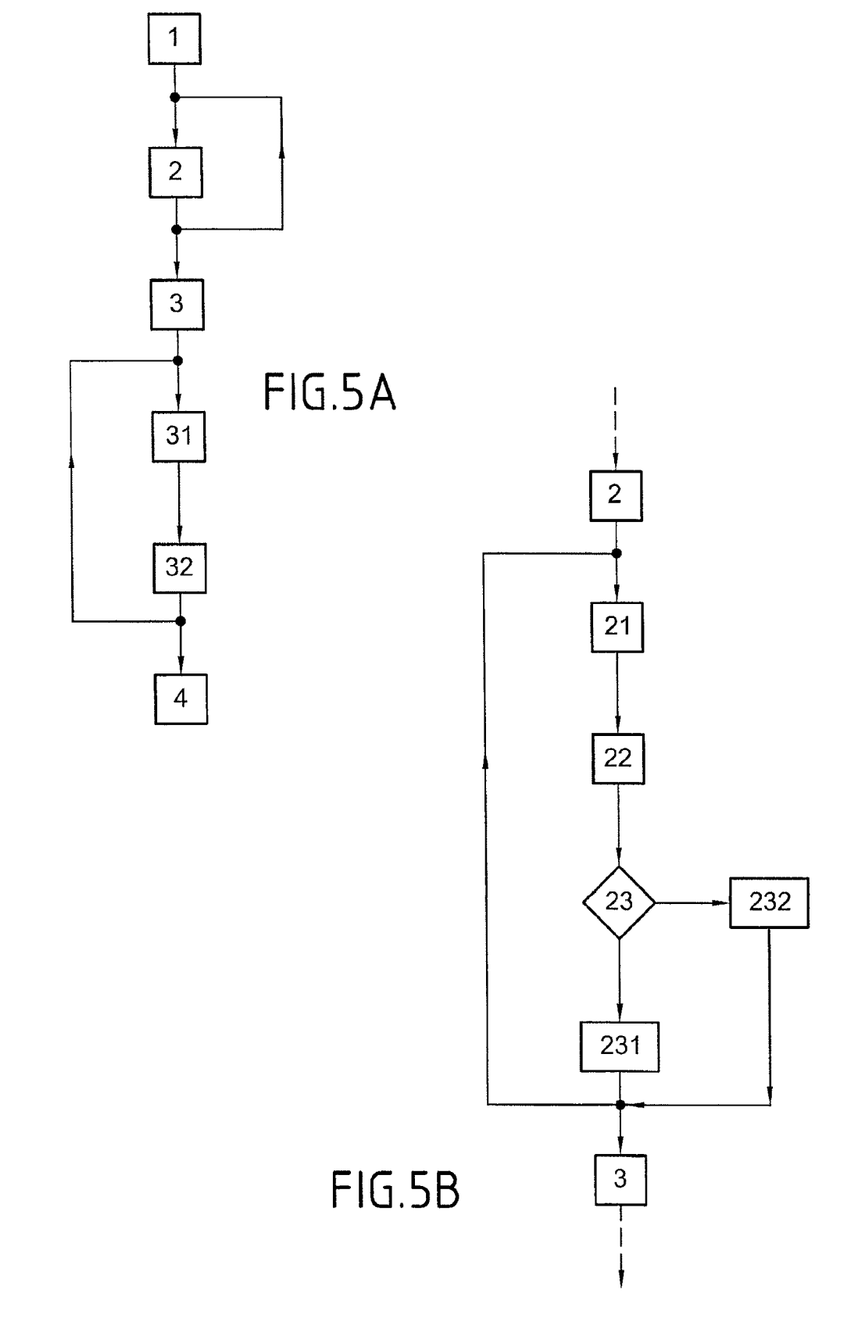

In FIG. 5a, stage 1 of the method of the invention consists of initialising the model in a state corresponding to a given state of the system. A given state of the system is characterised by the values of the characteristic variables of the system. Stage 2 consists of creating a discordant variables list into which are inserted the characteristic variables whose value in the system differs from those predicted by the model or where the value predicted by the model is inconsistent in relation to the state of the system. Stage 2 will be explained in greater detail below with reference to FIG. 5b.

Preferably, but not necessarily, a discordant variables list is sorted according to the dependency graph which connects the groups with a partial ordered relation, as described above, with reference to the examples in FIG. 1 and FIG. 4. Thus a discordant variable belonging to the group furthest upstream will be placed at the top of the list, and so on.

If a discordant variables list is empty, a loop feeds back to stage 2. Otherwise, stage 2 is followed by stage 3 for processing in a loop, meaning for each characteristic variable of a discordant variables list. This processing loop includes two successive stages. The first stage 31 is a stage for the creation of an initial list of suspect variables. These influent suspect variables are influent variables that are potentially responsible for the discordant value of the discordant variable being processed. Preferably, but not necessarily, these variables will all be influent variables forming part of the group to which belong the characteristic discordant variable being processed in the loop of stage 3. Also preferably, but not necessarily, this stage 31 for creation of the initial list of suspect variables is preceded by a pre-diagnosis stage to select a subset of suspect variables from among the influent variables forming part of the group to which belong the characteristic discordant variable being processed in the loop of stage 3.

The second stage 32 is a stage for the creation of a restricted list of suspect variables by filtration of the initial list of suspect variables. At the end of this processing stage, repeated for each of the characteristic variables of a discordant variables list, at stage 4 we get a list of the elements responsible for the discordances observed at stage 2. Ideally, this list is reduced to a single element, allowing a problem to be diagnosed rapidly and efficiently.

FIG. 5b provides a more precise picture of the nature of stage 2 mentioned previously. In fact stage 2 includes a stage 21 for prediction by the model of the state of the system from a given command or event. Stage 21 is followed by stage 22 for comparison between the state predicted by the model and the real state of the system. Stage 22 exits to the conditional branching 23 to stage 231 or stage 232. To be precise, when the comparison indicates a difference at the level of the characteristic variables, stage 231 is used to insert the characteristic discordant variable or variables into a discordant variables list. Otherwise, meaning when the comparison indicates no difference at the level of the characteristic variables and no inconsistency in relation to the state of the system (value in the model identical to the value in the system, but incompatible with the state of the latter), stage 232 is used to update the model and to validate its state. Stage 231 or 232 is followed by stage 3 described previously with reference to FIG. 5a.

Figure 5C:
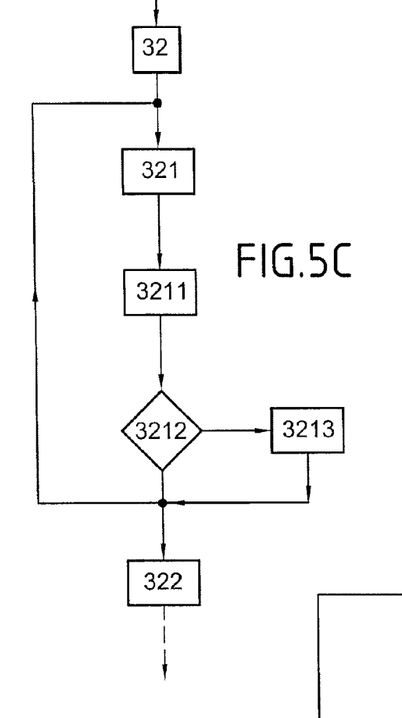

FIG. 5c provides greater detail on stage 32 for the creation of a restricted list of suspect variables previously described with reference to FIG. 5a. In fact this stage 32 includes a first stage 321 of filtration by elimination of the suspect variables that do not generate the discordant value of the discordant variable being processed at stage 3. This stage 321 more precisely consists of a loop on each suspect variable. For each of these suspect variables, a stage 3211 for prediction by the model of the state of the system from the change of value of the suspect variable is executed, limited to the group with the discordant variable and therefore without propagation to the other groups, with comparison of the state of the model and the state of the real system. Stage 3211 exits to the conditional branch at 3212 to stage 3213 or stage 322. To be exact, when the comparison, after the change (in the model) of the value of the suspect variable, indicates no discordant value for the characteristic discordant variable considered at stage 3 (in other words the model no longer predicts, or does not confirm, the discordance after this change of value of the suspect variable), then the suspect variable being processed in the loop goes into in the restricted list of suspect variables. Otherwise (the comparison confirms the discordance, still present despite the change of value of the suspect variable), the suspect variable being processed in the loop does not go into in the restricted list of suspect variables (stage 3213).

A list of suspect variables having been filtered a first time, we then exit to the second filtration stage 322 which will now be described in greater detail with reference to FIG. 5*d*. This second filtration stage includes, in a loop for each suspect variable, a stage 3221 for prediction by the model of the state of the system from the change of the value of the suspect variable, with propagation in all of the groups in which this suspect variable is an influent variable. The state predicted by the model is compared with the real state of the system leading to the conditional branching 3222 to stage 3223 or the second conditional branching stage 3224. Precisely, when the comparison after changing (in the model) the value of the suspect variable indicates no discordant value for any characteristic variable other than the characteristic discordant variable being processed at stage 3, and which is nevertheless present in a discordant variables list, then the suspect variable comes out of the restricted list of suspect variables (stage 3223). Otherwise, meaning if the comparison indicates no discordant value for any characteristic variable other than the characteristic discordant variable being processed at stage 3, and which is nevertheless present in a discordant variables list, a second test is performed at the level of the conditional branching 3224 to stage 3225 or the end of the loop. To be precise, if the comparison after change of the value of the suspect variable indicates a discordant value for any characteristic variable other than the discordant variable being processed at stage 3, and which is moreover not present in a discordant variables list, then the suspect variable comes out of the restricted list of suspect variables (stage 3225). Otherwise, it is not eliminated, and therefore remains in the restricted list of suspect variables delivered to the final stage 4.

In other words, in the comparison stages described above, it is seen that after changing the value of the suspect variable, if a discordance initially detected is not confirmed or if a discordance not initially detected is generated. If this is the case, the suspect variable is eliminated as suspect by the filter. Otherwise, it is retained.

The division of stage 32, for creating a restricted list of suspect variables by filtration of the initial list of suspect variables, into two successive sub-stages of filtration 321 and 322, does not limit the invention but simply optimises it. This division is based on the idea that it is possible, in a first stage, to perform the filtration in relation to the discordant variable being processed at stage 3 to end with a first reduction of a list of suspects. This then enables one to run the second filtration stage 322 in relation to all the other characteristic discordant variables, from a list of suspects of reduced size.

Preferably, but not necessarily, after processing stage 3 has been repeated for each of the variables of a discordant variables list, an additional localised investigation stage is executed. This stage can be based on information supplied by an operator for example, and prioritised.

Where appropriate, but not necessarily, after processing stage 3 has been repeated for each of the variables of a discordant variables list, a new stage is executed which consists of checking whether a new characteristic discordant variable has appeared, and if so, of executing an additional filtration stage in order to eliminate all the influent suspect variables of the restricted list of suspect variables which do not generate the discordant value of this new characteristic discordant variable. This filtration method operates on the same principle as the different filtration stages described previously.

Preferably, but not necessarily, during the execution of stage 2 for creating a discordant variables list, one does not use the complete model but rather the simplified model described previously. Thus during this stage, no account is taken of the influence of the intermediate influent variables.

The method of the invention having been described with reference to FIGS. 5*a* to 5*d*, and the modelling of the simplified system of FIG. 1 having been described with reference to FIGS. 2, 3*a*, 3*b* and 4, we are now going to describe an example of an analysis application of the system of FIG. 1, with diagnosis in two different scenarios.

We will assume that the current state of the system is as follows. The system is powered by 24 volts, the switch-on relay and the power-on relay have been operated, and the actuator is in the retracted position, meaning the left position. This current state is therefore characterised by: MEP=1 (E21=1), MES=1 (E22=1), A100=0 (EV=0), G=1 (E100=1), D=0 (E101=0) since the actuator is in retracted position, and 24V=1 (E20=1).

As described previously, the model is therefore initialised at stage 1 of FIG. 5*a* in the current state of the real system described above. Stage 2 of FIG. 5*a*, and as shown in detail in FIG. 5*b*, is then executed. Command A100 is received, meaning the command to the solenoid valve to open the actuator. The direct model therefore predicts, at stage 21 of FIG. 5*b*, the immediate opening of the actuator, and so the release of G. The direct model therefore indicates the immediate disappearance of E100, meaning that E100=0.

The real system changes state, and indicates E100=0 (all other characteristic variables remaining unchanged). E100=0 has been predicted, and therefore comparison stage 22 of FIG. 5*b* indicates no discordance between the real system and the model. As a consequence, the state of the model is updated (stage 232 of FIG. 5*b*), meaning that the actuator leaves the left position, and a new prediction by the model is executed, parallel to the operation of the real system (loop on stage 2 of FIG. 5*a*).

At stage 21 of FIGS. 5*a* and 5*b*, the model then predicts the appearance of D, so that D=1, within 5 seconds, and therefore predicts E101=1 within 5 seconds.

From this situation, we are now going to envisage two scenarios which will require a diagnosis.

Scenario 1:

We will assume that relay MES physically fails. We therefore observe, in the real system, the disappearance of E22, so that E22=0, and almost simultaneously the disappearance of E21, so that E21=0. Furthermore, the solenoid valve stops, since EV falls to 0, and the actuator stops opening and returns to the retracted position, meaning the left position. G=1 appears 2 seconds later. But E100=1 does not appear since MES, being broken, is no longer powering it.

The model, which of course has not observed the fact that the relay MES is broken, therefore indicates E22=1 and E21=1. The comparison, at stage 22 of FIG. 5*b*, therefore reveals two characteristic discordant variables which are inserted into a discordant variables list. E22 concerns group G4 or group MES (or indeed axis MES), and E21 concerns group G7, or group MEP (or indeed axis MEP).

A discordant variables list containing E22 and E21 is preferably sorted in relation to the dependency graph of FIG. 4. G4 is upstream of G7 (MES is upstream of MEP), and E22 is therefore placed at the top of the list.

Next, the general processing stage 3 of FIG. 5*a* is executed in a loop on a discordant variables list. In a first stage, at stage 31 of FIG. 5a, the complete model (which includes all the intermediate influent variables) tells us that in group G4, the suspects are 24V, contact MES, coil MES, and fuse FUS1. The influence of each of these suspects will therefore be analysed, by modifying, one by one, their value in the model, during stage 32 of FIG. 5a. More precisely, this stage 32 is subdivided into stage 321 and stage 322.

To begin with then, stage 321 is executed on each of the suspects identified beforehand, in order to determine which are the ones among these suspects whose potential responsibility in the appearance of the discordance value being processed at stage 3 (here E22) is confirmed, and which will therefore be retained in a list of the suspects.

Stage 3211 is executed for suspect 24V. The latter is at 1 in the model, we can therefore now assume the disappearance of 24V, so that 24V=0 (meaning that coil MES is at 0, therefore that contact MES is at 0 and therefore that E22=0). The discordance on E22 is therefore confirmed, and the suspect 24V is retained (stage 3213).

Stage 3211 is executed for suspect contact MES. The latter is at 1 in the model, and we will therefore change its value and set it to 0. The obvious consequence according to the model is that E22 passes to 0. Here again, this change to contact MES confirms the discordance. Contact MES is therefore retained as a suspect (stage 3213).

Stage 3211 is executed for suspect coil MES. MES is at 1 in the model, and we therefore change its value to 0, which means that contact MES goes to 0, and so here again E22 goes to 0. The suspect coil MES is retained (stage 3213).

The last suspect of the initial list of suspects is fuse FUS1, for which stage 3211 is executed. FUS1 is at 1 (the correct operating state) in the model, so we will now consider this to be defective and set it to 0. This means that coil MES goes to 0, and then that contact MES goes to 0, and finally that E22 goes to 0. Once again, the discordance on E22 is confirmed, FUS1 is therefore retained in a list of suspects (stage 3213).

The next stage will therefore consist once again filtering a list of suspects (stage 322 of FIG. 5d, in a loop on a list of the suspects), no longer confining ourselves only to group G4 but also including the other groups. This stage therefore consists of propagating the change of value to the other groups.

At stage 3221, we therefore look at the suspect 24V, and we examine the consequences of its disappearance extended to the other groups. 24V goes to 0 (therefore E20, E21 and E22 go to 0), and EV, MEP, and MES go to 0 without any immediate change to the values of the characteristic variables. Stage 3223 is not executed, since the comparison indicates no disappearance of discordance (discordant E21 and E22 have been predicted). On the other hand, in the real system, E20 is equal to 1, and the discordance on E20 has not been recorded in a discordant variables list. 24V is therefore removed from a list of suspects and will not form part of the restricted list of suspects, in accordance with the execution of stage 3225.

Next, stage 3221 is again executed on the suspect contact MES. Contact MES is changed to 0 (simulating breakage of contact MES), then the model predicts the disappearance of E22 (E22=0), and MEP=0 so that E21=0. Furthermore, MEP=0 shuts down the solenoid valve, so that EV goes to 0, the negative movement of the actuator is triggered, and we predict the appearance of G within a certain time and the disappearance of D (but not E100=1 since MES=0). This is in accordance with the state of the real system, and confirms the two discordances initially detected (E21 and E22). In fact, all we have done is to confirm the discordances recorded beforehand in a discordant variables list (stage 3223 is therefore not executed).

The same method is used again for coil MES, obviously with the same result, which we will therefore not describe again here. The suspect coil MES is retained in the restricted list of suspects.

Finally, the blowing of fuse FUS1 is envisaged, with FUS1=0. As a result, MES and MEP go to 0, and we again get the same propagation. The suspect FUS1 is therefore retained in the restricted list of suspects.

At this stage, if the notion of synchronisation is built into the model, and with a very fine measurement, it is possible to distinguish the case of fuse FUS1 from those of the contact and of coil MES. In fact, if the fuse blows, the disappearances of MES and MEP will be synchronous, while otherwise, the disappearance of MES results in the disappearance of MEP, with a time offset of 100 to 200 ms for example, between the passage of E22 to 0 and the passage of E21 to 0.

The method of the invention indicates that we must now repeat the processing on the second variable of a discordant variables list, that is on E21 (main loop on processing stage 3 of FIG. 5a). Here again, we will again not describe in detail this stage applied to the characteristic discordant variable E21, since it is similar in every way to that which has just been described for E22, and the results are the same in that relay MES (coil and contact), and where appropriate fuse FUS1, are retained as suspects.

The location of the problem has been greatly facilitated, and final manual checks will then show whether the relay MES is broken.

Scenario 2:

We will now assume that it is not relay MES but sensor D that is broken. D therefore remains locked on 0. We then observe in the real system, after the elapse of 5 seconds (+a tolerance) that E101 has not changed to 1. Now the model predicted E101=1, and has therefore, by executing stages 21 and 22 of FIG. 5b, has created a discordant variables list and inserted E101 into it.

The list is therefore reduced to a single element, so that sorting is unnecessary. The single discordance is therefore processed at stage 3 of FIG. 5a (a loop will not be necessary of course). To begin with, the suspects belonging to group G8 in which E101 is located are identified at stage 31 of FIG. 5a. Relay MES is the first suspect, but it is not retained in this initial list of suspect variables, since it is upstream in the dependency graph of FIG. 4 and should therefore have been processed beforehand (is it was at 0, there would then be discordance in G4, already processed according to the hierarchy of the dependency graph); same comment for relay MEP; the other suspects are fuse FUE1, sensor D, fuse FUS2, and the actuator itself which may be trapped.

Stage 32 of FIG. 5a is therefore executed with, to begin with, loop 321 of FIG. 5c, on each of the suspects. At stage 3211 of FIG. 5c, we observe that the blowing of fuse FUE1, so that FUE1 =0, leads to the retention of E101 at 0. The discordance no longer appears, and suspect FUE1 is therefore retained (stage 3213). This also goes for sensor D and the trapped actuator.

Again at stage 3211, this time the blowing of the fuse FUS2 is envisaged, which leads to the shut-down of the solenoid valve and therefore the return of the actuator to the retracted position, so that G=1 after the elapse of 3 seconds. This is a new discordance (or a new discordant event) which does not belong to a discordant variables list. This change on FUS2 therefore leads to the appearance of a new discordance. FUS2 is therefore not retained in a list of suspects (stage 3213 is not executed).

Figure 5D:
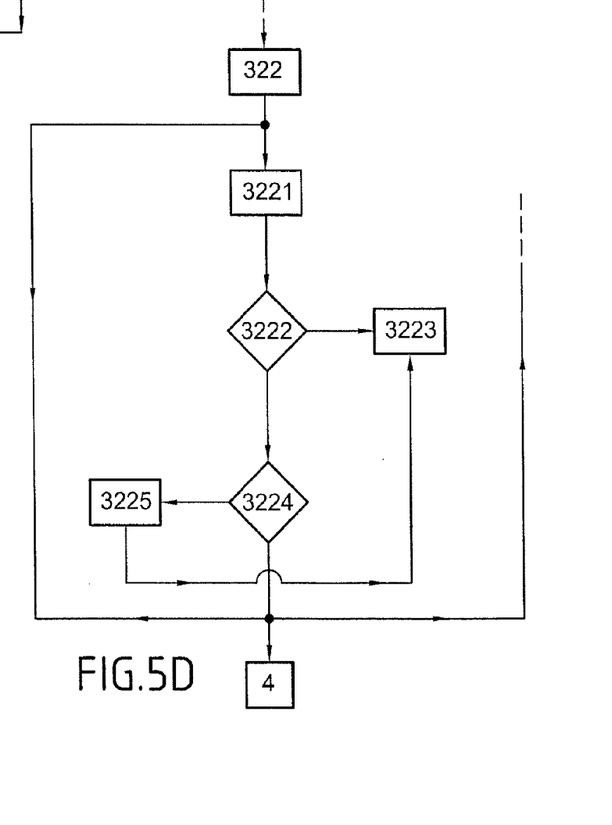

We now look at the list of suspects in order to filter it once again in accordance with stage 322 of FIG. 5d.

At stage 3221, we take FUE1 and change it to 0, which means that E100=0 and E101=0. If E100=1 appears later, FUE1 will be deleted from the list. But at this stage, it is confirmed.

Again at stage 3221, we envisage the blowing of sensor D, which leads to the disappearance of D. The discordance detected beforehand is confirmed, and there is no appearance of any new discordance. Neither stage 3223 nor stage 3225 is executed. Sensor D stays in the restricted list of suspects. This also goes for the trapped actuator.

We finally envisage, on returning to stage 3221, the blowing of fuse FUS2, leading to EV=0 and therefore a return of the actuator to the retracted position, with a consequent prediction of the appearance of G within 3 seconds (or E100=1 within 3 seconds). For the same reasons as for suspect sensor D, FUS2 is therefore retained in the restricted list of suspects.

Four suspects therefore remain in the list at this stage. But 3 later seconds (plus a certain tolerance), E100=1 does not appear in the real system. This observation allows us to eliminate suspect FUS2 from the restricted list of suspects.

We therefore continue with localised investigations. As soon as we press the power-off button BPMHP in order to work on the actuator, the actuator returns to the retracted position, and therefore E100=1 appears, allowing us to eliminate suspect FUE1 and the trapped actuator from the list.

Finally, there remains only a single suspect, namely sensor D. To say the least, diagnosis is then easy.

Figure 6:
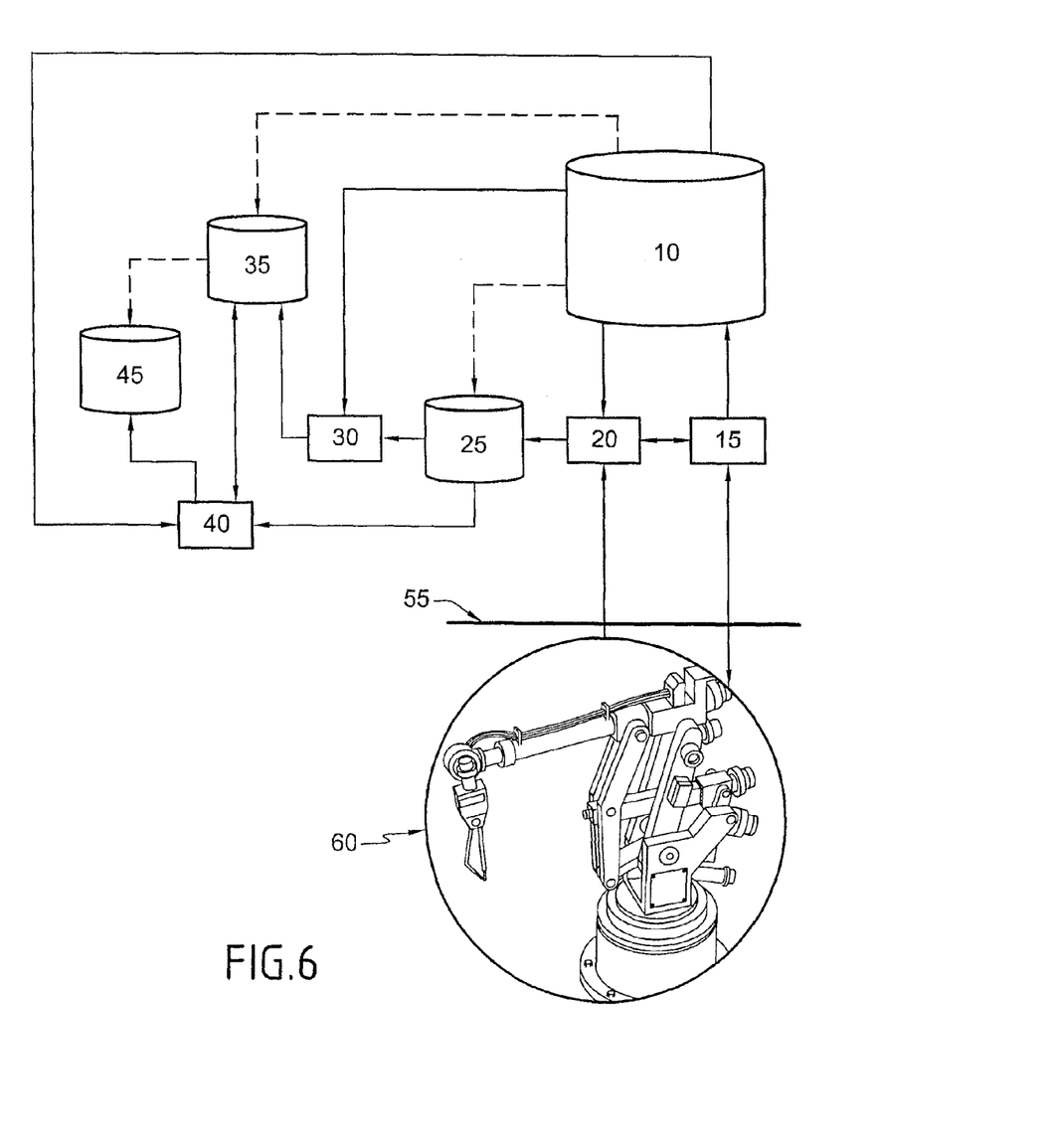
FIG. 6: schematically represents the analysis device according to the invention.

Finally, FIG. 6 schematically represents an analysis device according to the invention, which can be used to implement the method of the invention as describes previously.

The device thus includes resources 10 for storage of the data which define the model of the real system 60 that one wishes to analyse. The device also includes processing resources 15 which are used to execute the model, and resources 20 for comparison of the state of the system predicted by the model and the state of the real system. These resources 20 and 15 communicate with the real system by means of a conventional communication interface. The comparison resources 20 deliver a list of characteristic discordant variables, which is stored using the storage resources 25. The device also includes resources 30 for the selection, in the model, of influent suspect variables that may have generated the discordant value of at least one characteristic discordant variable. The device also includes resources 40 for filtration of the influent suspect variables selected by the selection resources 30, which are used to obtain the influent suspect variables in restricted numbers. The initial influent suspect variables, and the influent suspect variables in restricted numbers after filtration by the filtration resources 40, are stored by storage resources 35 and 45 respectively.

The method of the invention, implemented by such a device, can therefore advantageously be used for the analysis of an industrial system controlled by automatic control systems.

All of this description is given by way of an example, and does not limit the invention. In particular, the description of the device of the invention separates the storage resources 10, 25, 35 and 45, but it can be seen quite clearly that a single storage resource could be used to these ends.

Furthermore, the method used in order to obtain the model used as the basis for executing the method of the invention, does not limit the invention. Any method (adaptation of a known model, the learning principle, etc.) that leads to a model defined by characteristic variables and influent variables, with all of these variables being divided into one or more groups, can he used.

The invention claimed is:

1. A computerized method for the analysis of a system, the method comprising:
    initializing by a processor a model into a state corresponding to a given state of the system,
    creating a discordant variables list of characteristic variables whose value in the system differs from that predicted by the model,
    and for each characteristic variable of said discordant variables list, a process that includes:
    creating an initial suspect variables list of influent variables that may have generated the discordant value of said discordant variable,
    creating a restricted list of suspect variables by filtration of said initial list of suspect variables, and
    wherein, based on the use of a model of said system, where said model includes at least two variables divided into one or more groups, each of said groups being defined by, and including, one or more variables called characteristic variables and grouping together all the other variables, called influent variables, having a direct or indirect influence on the value of at least one of said characteristic variables of said group.

2. A method according to claim 1, wherein said stage for creation of said discordant variables list includes:
    predicting by the model the state of the system from a given command,
    comparing the predicted state with the real state of the system.

3. A method according to claim 2, further comprising:
    when said comparison indicates a difference between the respective values of one or more characteristic variables in the predicted state and the respective values of these so-called characteristic variables in the real state of the system, inserting the discordant variables into said discordant variables list,
    when said comparison indicates no difference between the value of a characteristic variable in the predicted state and the value of this defining variable in the real state of the system, updating the model in order to validate the state of the system.

4. A method according to claim 1, wherein creating an initial list of suspect variables includes selecting all the influent variables forming part of the group to which said discordant variable concerned at said process belong.

5. A method according to claim 1, wherein creating a restricted list of suspect variables includes eliminating said suspect variables from said initial list of suspect variables which:
    either do not generate any discordant value in the model, for each of the variables belonging to said discordant variables list,
    or generate a discordant value in the model, for at least one characteristic variable not belonging to said discordant variables list.

6. A method according to claim 1, wherein creating a restricted list of suspect variables includes:
    a first filtration stage by elimination of said suspect variables that do not generate the discordant value of said discordant variable concerned at stage,
    a second filtration stage by elimination of the said suspect variables which:
    i. either generate a discordant value for one or more characteristic variables other than the said discordant variable concerned at said process and which do not belong to said discordant variables list, ii. or generate no discordant value for one or more characteristic variables other than said discordant variable concerned at said process and which belong to the said discordant variables list.

7. A method according to claim 1, wherein creating an initial list of suspect variables includes a pre-diagnosis stage to select a subset of the suspect variables from among the influent variables forming part of the group to which said discordant variable concerned at said process belong.

8. A method according to claim 1, wherein a characteristic variable is to be discordant when the value of the characteristic variable as predicted by said model is not verified in the real system.

9. A method according to claim 1, wherein, prior to creating an initial list of suspect variables, the discordant variables list is sorted.

10. A method according to claim 9, wherein the sort is based on a partial order relation associated with a dependency graph which sequences said groups of the model, with the characteristic discordant variable belonging to the group of highest rank being placed in the first position, and so on.

11. A method according to claim 1, wherein, after processing has been repeated for each of the variables of said discordant variables list, the method includes a stage of localised investigations.

12. A method according to claim 1, wherein, after processing has been repeated for each of the variables of said discordant variables list, and when a new characteristic discordant variable has appeared, the method includes an additional filtration stage in order to eliminate all the influent suspect variables resulting from repetition of processing which do not generate the discordant value of said new characteristic discordant variable.

13. A method according to claim 1, where there is an influent variable over which no other variable of the same group has influence, called a primary influent variable, a simplified model is constructed from the initial one by taking account in each group only of the influent primary variables and the characteristic variables.

14. A method according to claim 13, wherein said simplified model is used in place of the initial model in creation of said discordance lists.

15. A device for the analysis of a system, based on the use of a model of said system, where said model includes at least two variables divided into one or more groups, each of said groups being defined by, and including, one or more variables called characteristic variables, and grouping together all the other variables, called influent variables, having a direct or indirect influence on the value of at least one of said characteristic variables of said group, and implementing the method according to claim 1, wherein the device comprises:
   a. a first storage unit for storage of the data defining the model,
   b. a processor to implement the model,
   c. a comparator for comparing the state of the system predicted by the model and the state of the real system,
   d. a second storage unit for the storage of a list of characteristic discordant variables resulting from the comparison by said comparator,
   e. a selector, in the model, of the initial influent suspect variables that may have generated the discordant value of at least one characteristic discordant variable,
   f. a filter of said initial influent suspect variables in order to obtain the restricted influent suspect variables,
   g. a third storage unit for said initial influent suspect variables and for said restricted influent suspect variables.

16. A method of analyzing an industrial system controlled by automatic control systems, the method comprising:
   initializing by a processor a model into a state corresponding to a given state of the system,
   creating a discordant variables list of characteristic variables whose value in the system differs from that predicted by the model,
   and for each characteristic variable of said discordant variables list, a process that includes:
      creating an initial suspect variables list of influent variables that may have generated the discordant value of said discordant variable,
      creating a restricted list of suspected variables by filtration of said initial list of suspect variables, and wherein based on the use of a model of said system, where said model includes at least two variables divided into one or more groups, each of said groups being defined by, and including, one or more variables called characteristic variables and grouping together all the other variables, called influent variables, having a direct or indirect influence on the value of at least one of said characteristic variables of said group.

* * * * *